United States Patent
Sundaram et al.

(10) Patent No.: US 10,812,544 B2
(45) Date of Patent: Oct. 20, 2020

(54) TRANSFER OF DATA STREAMING SERVICES TO PROVIDE CONTINUOUS DATA FLOW

(71) Applicant: salesforce.com, inc., San Francisco, CA (US)

(72) Inventors: Shreedhar Sundaram, San Mateo, CA (US); Yogesh Patel, Dublin, CA (US); William Victor Gray, Kitchener (CA); Shaahin Mehdinezhad Rushan, Dublin, CA (US); Mahalaxmi Sanathkumar, San Francisco, CA (US); Anjani Gupta, Redwood City, CA (US); Rajkumar Pellakuru, San Jose, CA (US); Bhaves Patel, Pittsburg, CA (US); William Edward Hackett, Vallejo, CA (US)

(73) Assignee: salesforce.com, inc., San Francisco, CA (US)

( * ) Notice: Subject to any disclaimer, the term of this patent is extended or adjusted under 35 U.S.C. 154(b) by 170 days.

(21) Appl. No.: 15/881,665

(22) Filed: Jan. 26, 2018

(65) Prior Publication Data
US 2019/0238604 A1    Aug. 1, 2019

(51) Int. Cl.
*H04L 29/06* (2006.01)
*H04L 12/911* (2013.01)

(52) U.S. Cl.
CPC .......... *H04L 65/4069* (2013.01); *H04L 47/74* (2013.01)

(58) Field of Classification Search
CPC .................................................. H04L 65/4069
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Nicholas R Taylor
*Assistant Examiner* — Sanjoy Roy
(74) *Attorney, Agent, or Firm* — Jaffery Watson Mendonsa & Hamilton LLP

(57) ABSTRACT

Embodiments regard transfer of data streaming services to provide continuous data flow. An embodiment of an apparatus includes a processor to process data for streaming to one or more organizations; and a memory to store data for streaming to the one or more organizations, wherein the apparatus is to provide a centralized work distribution service to track status of each of a plurality of data streams to the one or more organizations, and a plurality of nodes, each node being a virtual machine to stream one or more data streams to the one or more organizations, each node including a first daemon service to monitor connectivity of the node to dependency services for the node and, upon detecting a loss of connection to one or more of the dependency services, the node to discontinue ownership of the one or more data streams of the node and a second daemon service to poll the centralized work distribution service for data streams that are not assigned.

20 Claims, 8 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,095,547 B1* | 10/2018 | Kulkarni .......... G06F 16/24568 |
| 10,467,105 B2* | 11/2019 | Theimer ............ G06F 11/3006 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2015/0134626 A1* | 5/2015 | Theimer ............ G06F 11/1469 707/693 |
| 2017/0075693 A1* | 3/2017 | Bishop .................. G06F 9/5088 |
| 2017/0083396 A1* | 3/2017 | Bishop .................... G06F 11/14 |

* cited by examiner

US 10,812,544 B2

TRANSFER OF DATA STREAMING SERVICES TO PROVIDE CONTINUOUS DATA FLOW

TECHNICAL FIELD

Embodiments relate to techniques for computer database operation. More particularly, embodiments relate to transfer of data streaming services to provide continuous data flow.

BACKGROUND

In a system in which data is streamed to one or more customers or organizations, there is need to provide continuous and uninterrupted data flow to allow accurate and timely processing, and to meet performance standards. The processing may include data streams handled by one or more virtual machines.

However, in a system virtual machines may fail and cease to handle the required data streams. The loss of a virtual machine creates a risk of data loss and failure of a customer or organization to meet required performance standards. A central service may be able to determine that a virtual machine has stopped operating if, for example, the virtual machine fails to respond to an inquiry, but in a large system in which there are numerous data streams and supporting virtual machines, such operation may cause delay before the loss of a virtual machine is discovered and another virtual machine is able to continue the data stream.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

In a computing environment, an apparatus, system or process to enable transfer of data streaming services to provide continuous data flow.

In some embodiments, an apparatus, system, and process provide seamless transfer of streaming services that provide data to organizations, such as streaming CRM (Customer Relationship Management) data to generate metrics. An embodiment is directed to providing continuous and uninterrupted data flow by a cluster of nodes, where nodes are virtual machines, such as a streaming application to listen to changes in CRM and transmit the changed data without data manipulation.

In an embodiment, each node in a cluster of nodes includes a first daemon service (a daemon service being generally a program that runs as a background process) to monitor dependency services required for operation of the node and a second daemon service to poll a central work distribution service for unassigned jobs, each job being a data stream for a particular organization (which may also be referred to as a customer). Dependency services for a node may include, but are not limited to, a database service, a coordination service, and a cache service. When the first daemon service of a first node detects loss of connectivity with any external dependency services, the first node commences turnover of ownership of all jobs supported by the node to the central work distribution service to allow smooth handoff to another node, the handoff of jobs allowing the central work distribution service to quickly recognize loss of the first node and to change status of the respective jobs from active to available such that the jobs may be reassigned. The second daemon service of node is to poll the central work distribution service for any available jobs, which thus allows the data streaming for each organization that is performed by a terminated node to quickly and smoothly resume by another available node.

Figure 1:
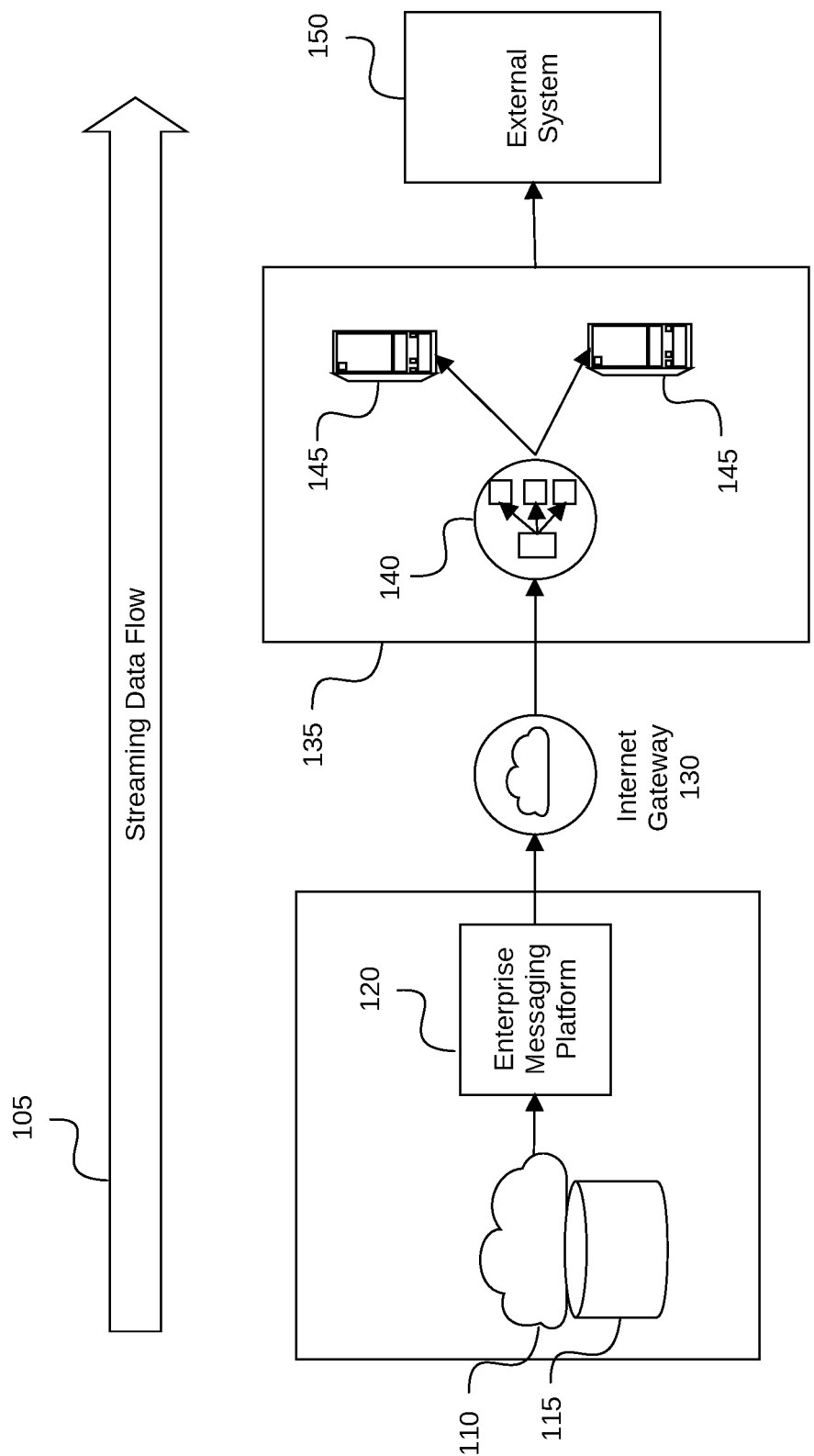
FIG. 1 is an illustration of a data pipeline serviced by multiple nodes according to some embodiments.

FIG. 1 is an illustration of a data pipeline serviced by multiple nodes according to some embodiments. As illustrated in FIG. 1, a streaming data flow 105 is provided to an external system 150, the external system being a receiving organization. In operation, the data streaming may occur in a data system, such Salesforce™ or other system processing CRM data, operating with a database 115 via an enterprise message platform 120. In some embodiments, data may be transferred via an internet gateway 130 to a cloud computing platform, such as Amazon Web Services™ (AWS), which is illustrated as including an elastic load balancer 140 providing data for processing to multiple servers 145, and then providing the resulting data stream to the external system 150. In operation, there will be numerous data streams that are provided to multiple external systems, wherein a data streaming service to a particular organization may be referred to as a data streaming job.

In some embodiments, a streaming solution, also referred to as a data pipeline is designed to ingest and transform large amount of data to, for example, apply machine learning on and come up with useful metrics for customer. Each streamer application may exist in a cloud computing platform, such as Amazon Web Services, each streamer application being an elastic bean instance (virtual machine). The data stored on each virtual machine is not persistent, and the virtual machine state is transient, i.e., a virtual machine may die (terminate) or a new virtual machine may be added to the cluster at any time.

In operation, the streamer application may, for example, listen to changes occurring on a customer relationship management (CRM) system and send data representing changes in the CRM system to the external system without manipulating the data. In such operation, each of multiple nodes (virtual machines) in a cluster is servicing multiple organization in streaming data. However, real time calculation of intelligent metrics requires uninterrupted streaming of data to the external system. Further, this will be required to meet the service level agreement (SLA) for the data service, and thus it is essential that data streaming performed by the cluster of nodes continues in a continuous and interrupted fashion, even as nodes are lost.

Each node running a streamer application is required to be connected to certain dependency services in the cluster for processing and streaming data across the data pipeline, wherein the dependency services may include, but are not limited to, database, coordination, and cache services. The loss of any services will result in the loss of operation of the virtual machine. Due to nature of the distributed system, which will be geographically spread to multiple data centers, it is possible for nodes to experience connection interruption or inaccessibility of the shared resource. If a node loses connection to any of these external dependency services, streaming for all the organization served by that node would be interrupted. However, one node experiencing loss of connectivity with dependency services does not mean other nodes are necessarily affected as such nodes may be located in other geographic locations.

In some embodiments, an apparatus, system, or process is provided for uninterrupted and continuous service for streaming. In some embodiments, the apparatus, system, or process enables smooth transfer of data streaming for organizations from nodes with loss of connectivity to nodes that are still connected, fully functional, and still servicing.

In some embodiments, the transfer of ownership of data streaming jobs between nodes is to occur in manner such that only a single node of a cluster of nodes is streaming data for a particular organization at any given time. The limitation to a single node is provided to avoid overlap of streaming data for a same organization during a transfer of streaming services between nodes.

In some embodiments, the nodes of a cluster do not share any information with other nodes of the cluster, and each node operates independently from each other node without any communication overhead between such nodes. In this manner, continuous and uninterrupted data streaming may be provided while avoiding additional overhead and maintaining independence of each node.

Figure 2A:
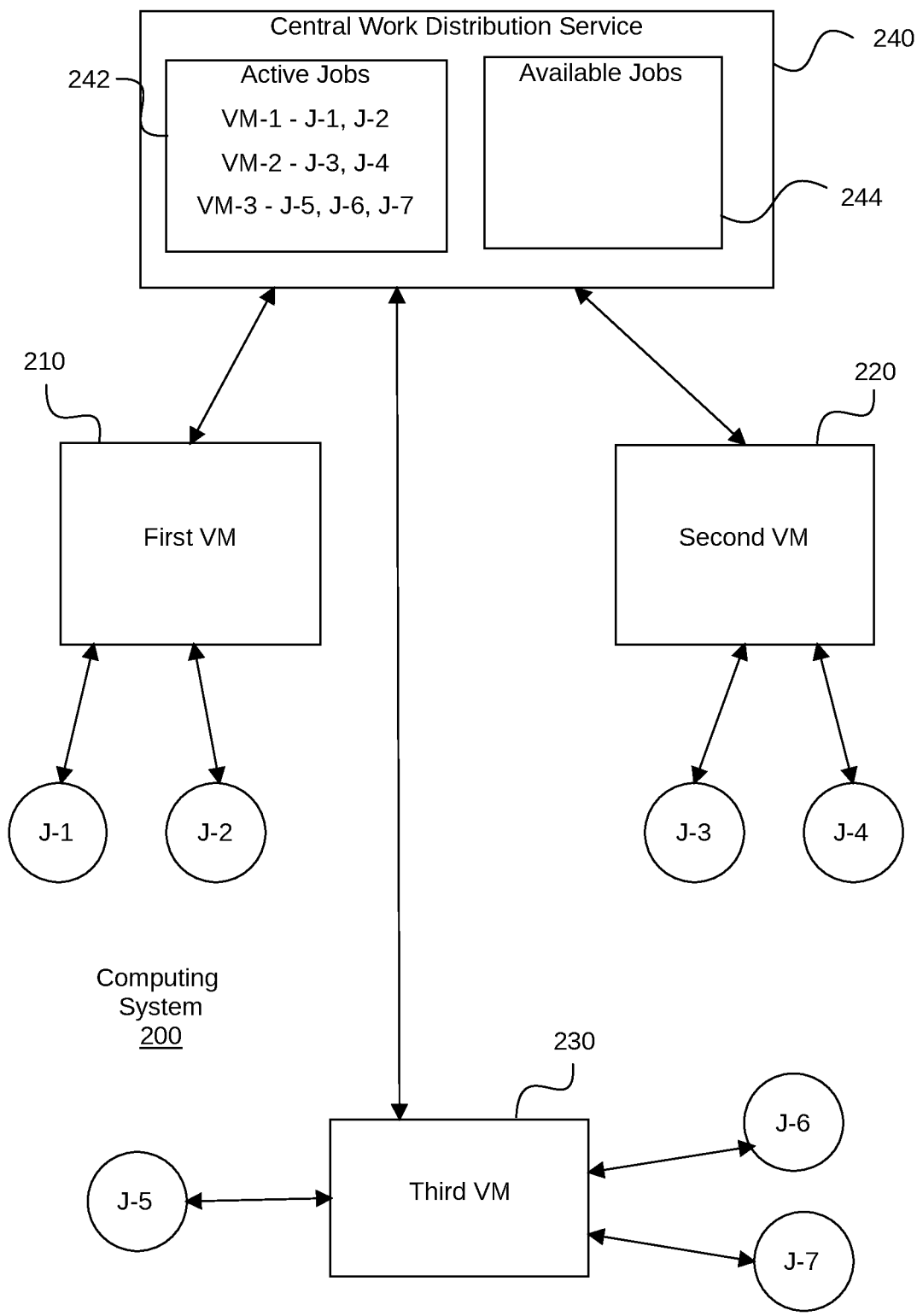
FIGS. 2A to 2C are illustrations of a system to transfer of data streaming services to provide continuous data flow according to some embodiments.
Figure 2B:
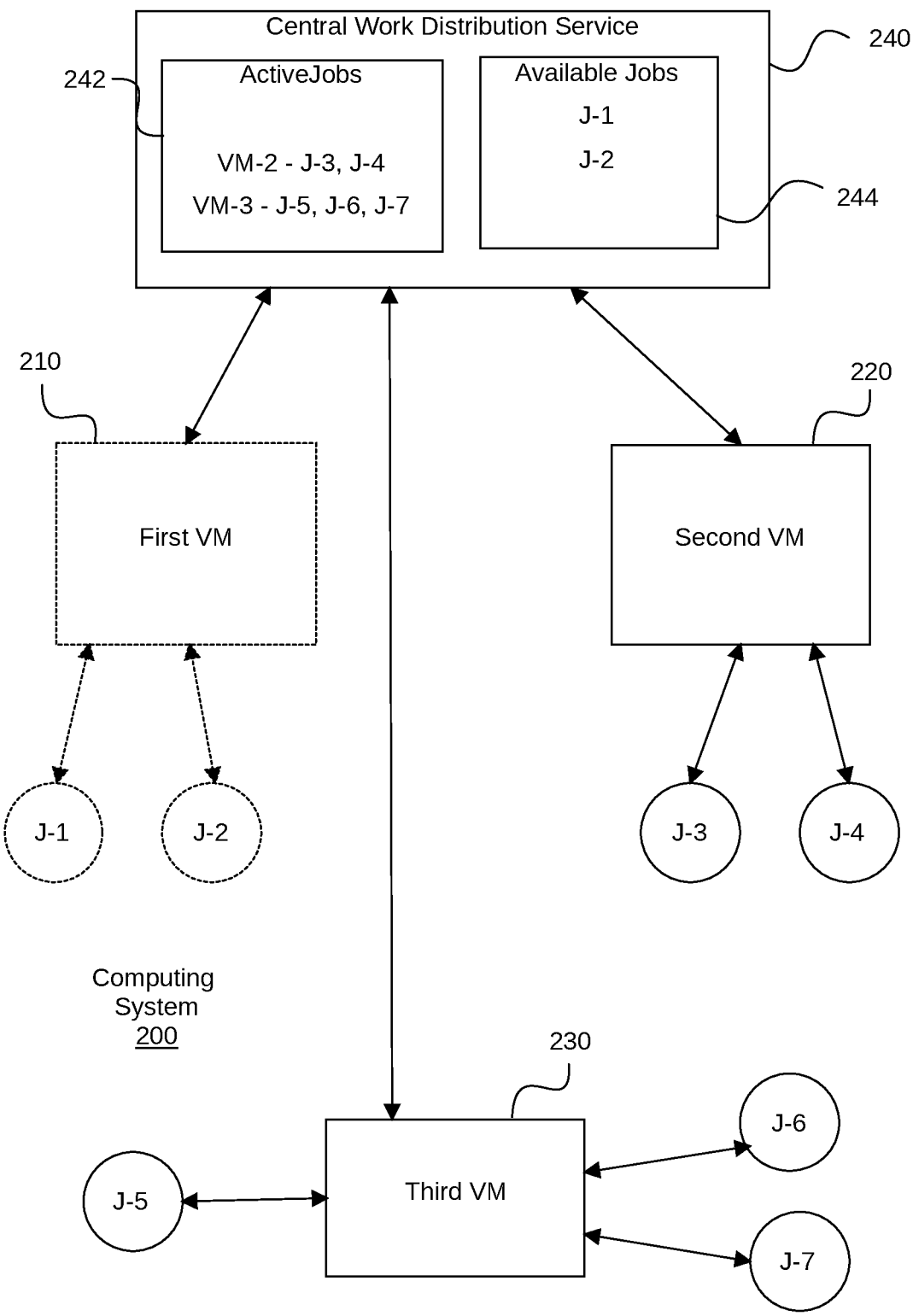
Figure 2C:
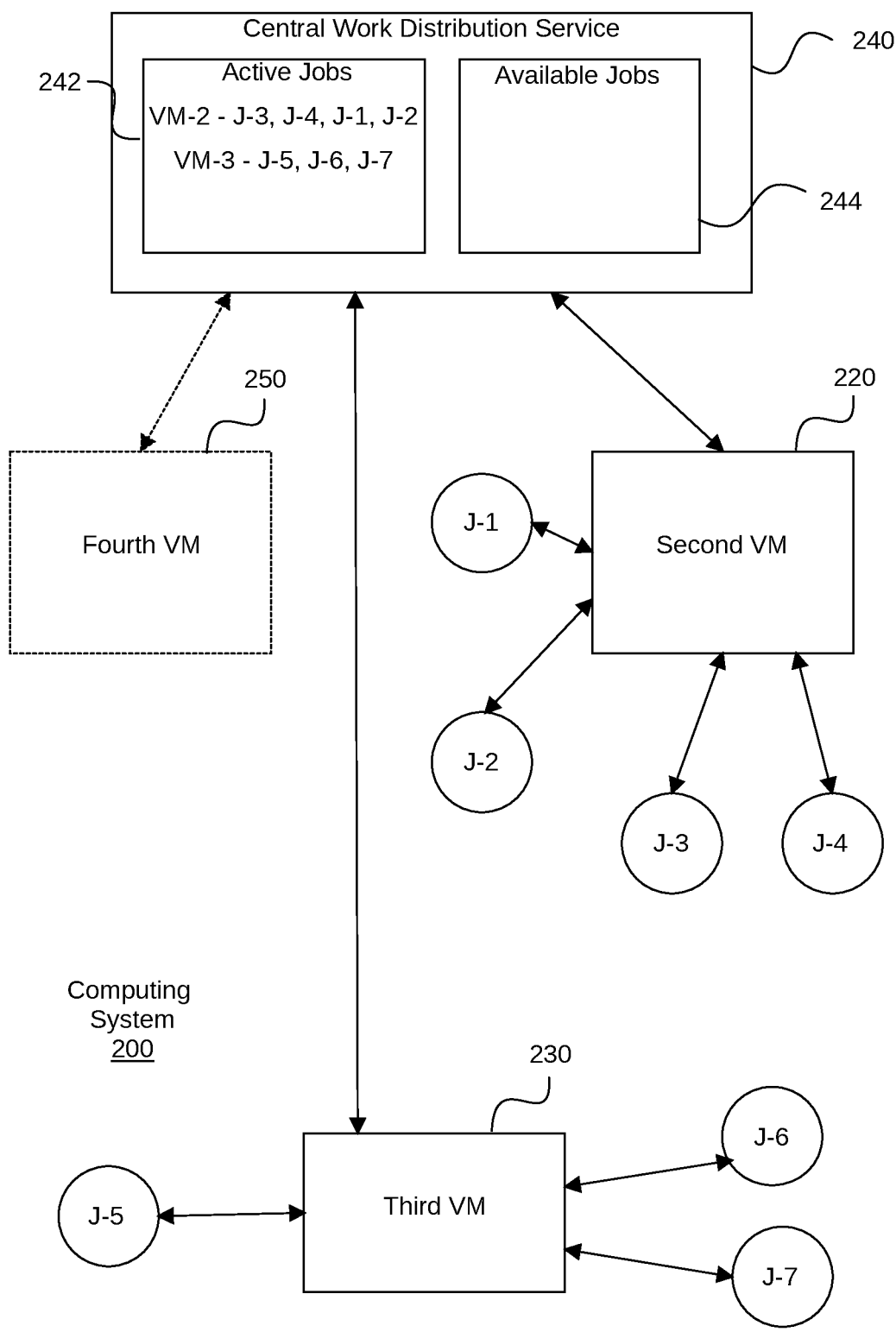

FIGS. 2A to 2C are illustrations of a system to transfer of data streaming services to provide continuous data flow according to some embodiments. As illustrated in FIG. 2A, a computing system 200 includes multiple nodes (virtual machines) to support data streams to customers.

Figure 3:
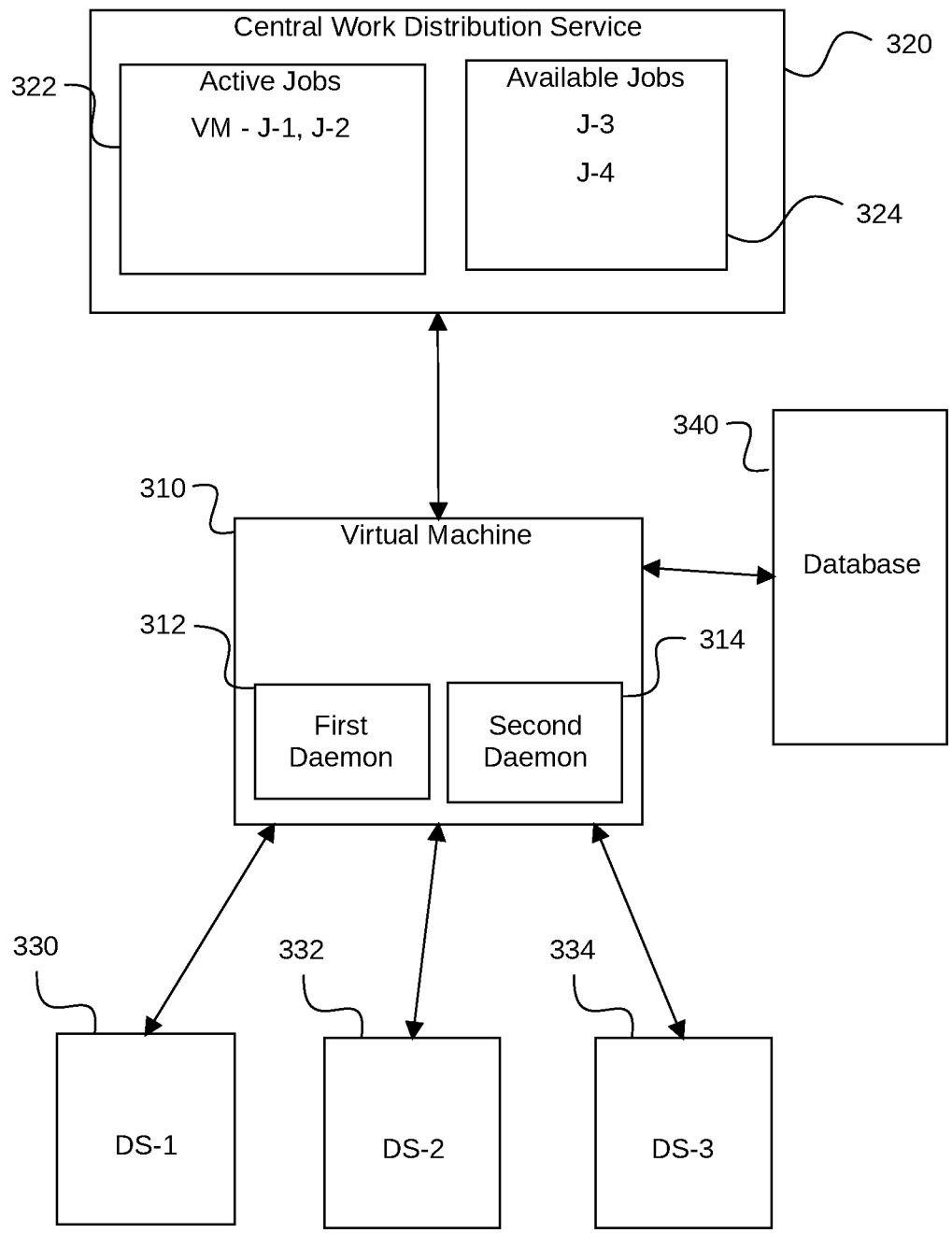
FIG. 3 is an illustration of elements of a system to provide continuous data services according to some embodiment.

For simplicity, the cluster of nodes is shown initially as three virtual machines operating as stream services, a first virtual machine 210 that is supporting two data streaming jobs (J-1 and J-2), a second virtual machine 220 that is supporting two data streaming jobs (J-3 and J-4), and a third virtual machine 230 that is supporting three data streaming jobs (J-5, J-6, and J-7), and it may be assumed that each virtual machine can support additional data streaming jobs. However, a system may include any number of virtual machines with differing capabilities, with the machines being removed or added at any time. The virtual machines 210-230 may be each be a virtual machine as illustrated in FIG. 3.

In some embodiments, each data stream to an organization is served by only one node (virtual machine), thus preventing data duplication between the nodes as a first node is replaced by another for data streaming jobs when the first node fails. In some embodiments, the nodes 210-230 operate without communicating with other nodes in the cluster, thus allowing for simple construction and operation of each node.

In some embodiments, the system 200 further includes a central work distribution service 240 to provide a central service for distributing and tracking status of each data streaming job. In some embodiments, the database system maintains a status of all active jobs, which are data streaming jobs that are assigned to and being supported by virtual machines, and available jobs, which are data streaming jobs that are not currently assigned to virtual machines. The central work distribution service 240 may include the capability to poll each node or otherwise monitor the health of the nodes in the cluster of nodes, and to change the status of data streaming jobs from active to available when the central work distribution service determines that a node is not reachable. However, such operation may result in delays before it is possible to discern that a node is lost and thus that the ownership of the data streaming jobs serviced by such node should be transferred.

In some embodiments, each virtual machine includes a first daemon service to monitor dependency services and a second daemon service to obtain jobs for servicing by polling the central work distribution service 240 for available jobs, and to accept and service such available jobs. In some embodiments, the virtual machines operate without communicating with each other. As illustrated in FIG. 2A, there are no jobs that are currently available, but the availability of jobs may change at any time, as jobs are commenced or ended, and as virtual machines are added or removed from the system 200.

As illustrated in FIG. 2B, a first daemon service of the first virtual machine 210 may detect a loss of connection with one or more dependency services. In some embodiments, upon detecting the loss of connection with dependency services, the first virtual machine 210 is to return ownership of the data streaming jobs services by the first virtual machine to the central work distribution service 240, the jobs being J-1 and J-2 in this example.

In some embodiments, the central work distribution service 240 is to change the status of the returned jobs to indicate the availability of such jobs, as illustrated as the assigned jobs 242 no longer including J-1 and J-2, such jobs being then changed to available status, as illustrated as J-1 and J-2 being includes as available jobs 244. In some embodiments, the second daemon service of each of the remaining active virtual machines, the active virtual machines being the second virtual machine 220 and third virtual machine 230, continue to poll the central work distribution service 240 regarding available data streaming jobs, and thus will be informed of the availability of jobs J-1 and J-2.

In some embodiments, when a first node is lost, data is maintained in a database (such as database 340 illustrated in FIG. 3) such that the state of a particular data stream is known, allowing a second node to continue data streaming from a starting point without loss or repetition of data.

As illustrated in FIG. 2C, the active virtual machines, the remaining active virtual machines being the second virtual machine 220 and third virtual machine 230, are to poll the central work distribution service 240 regarding available data streaming jobs. In such operation, there is no requirement for the second virtual machine 220 and third virtual machine 230 to be notified regarding the termination of the first virtual machine 210, as illustrated in FIG. 2A.

In a particular example, the J-1 and J-2 jobs may be available at a time when the second virtual machine 220 polls the central work distribution service 240, and thus J-1 and J-2 are distributed to the second virtual machine 220. As illustrated in FIG. 2C, the central work distribution service 240 is to change the status of the J-1 and J-2 data streaming jobs to be active, thus the active jobs 242 as illustrated indicate that virtual machine 220 has ownership of jobs J-3, J-4, J-1, and J-2, and the third virtual machine 230 has ownership of jobs J-5, J-6, and J-7, with there currently being no available jobs 244. In some embodiments, one or more additional virtual machines, such as the illustrated new virtual machine 250 in FIG. 2C, may also be added to the cluster to provide additional support for streaming of data services as required.

FIG. 3 is an illustration of elements of a system to provide continuous data services according to some embodiment. In some embodiments, a virtual machine 310, such as one of the nodes in a cluster as illustrated in FIGS. 2A-2C, includes at least two daemon services, the daemon services including a first daemon service 312 to monitor connection with the dependency services of the virtual machine 310, the dependency services being illustrated as DS-1 330, DS-2 332, and DS-3 334; and a second daemon service 314 to poll a central work distribution service 320 for available data streaming jobs and to accept assignment of available jobs. In the illustrated example shown in FIG. 3, the virtual machine 310 has ownership of two data streaming jobs, J-1 and J-2 as indicated in the active jobs 322 of the central work distribution service 320, and there are currently two available jobs, J-3 and J-4 as indicated in the available jobs 324 of the central work distribution service 320.

In a first example, upon the first daemon service 312 detecting loss of connectivity to any of the dependency services 330-334, the daemon service is to begin turning over ownership of the jobs currently owned by the virtual machine 310, the jobs being J-1 and J-2, to enable efficient turnover and reassignment of the jobs to another virtual machine. In some embodiments, the state of each of the data streaming jobs being turned over is maintained in a database 340 (which may be, for example, a Cassandra™ database, Apache® Software Foundation) to enable the replacement virtual machine to continue the data streaming without interruption. Further, the virtual machine is the sole owner servicing the J-1 and J-2 data streams, and thus the return of ownership of the data streams to the central work distribution service 320 and the subsequent assignment of the data streams to the replacement virtual machine allows the transfer to be made without data repetition in the transfer.

In a second example, the virtual machine 310 includes the second daemon service 314, which is to poll the central work distribution service 320. In the scenario illustrated in FIG. 3, upon polling the central work distribution service 320, the virtual machine 310 will be notified of the availability of data steaming jobs J-3 and J-4, and the virtual machine 310 can take ownership of such jobs.

Figure 4:
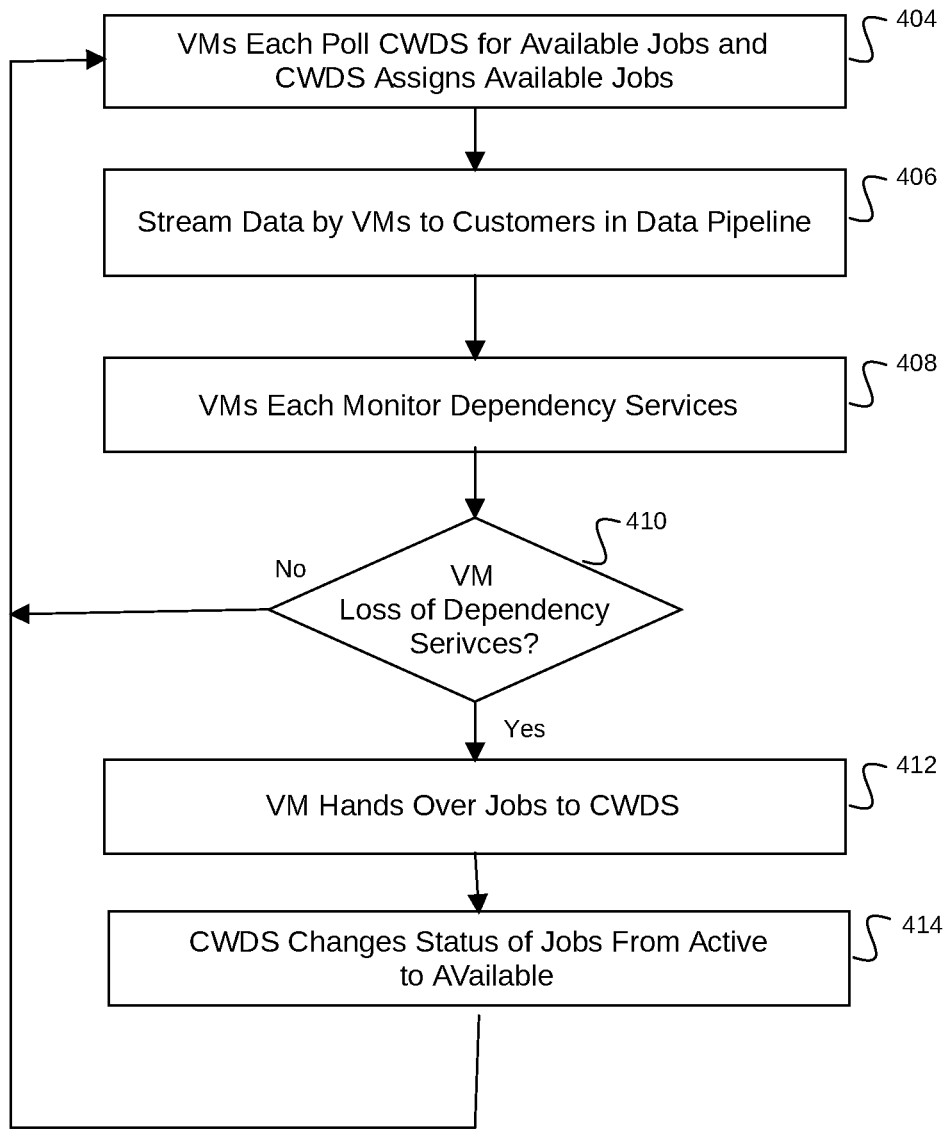
FIG. 4 is a flowchart to illustrate a process for transfer of data streaming services to provide continuous data flow according to some embodiments.

FIG. 4 is a flowchart to illustrate a process for transfer of data streaming services to provide continuous data flow according to some embodiments. In some embodiments, a central work distribution service (CWDS) is provided to distribute data streaming jobs to multiple nodes (virtual machines) in a cluster, and to track active and available jobs. In some embodiments, the virtual machines are each to poll the central work distribution service (such as through operation of a second daemon service 314 as illustrated in FIG. 3) for available jobs, and the central work distribution service is to assign ownership of such available jobs to the polling virtual machines 404. In this manner, any available jobs are efficiently reassigned to available virtual machines. The virtual machines are to stream data to customers in a data pipeline 406, such as illustrated in FIG. 1. For example, the streamer applications performed by the virtual machines may listen to the changes occurring on the CRM and sends such data to customers without manipulating the data.

In some embodiments, each of the virtual machines is also to monitor dependency services for such virtual machines 408. If there are no losses of virtual machines, such process can continue with the virtual machines polling the central work distribution service and the assignment of data streaming jobs 404 as such jobs become available and as new virtual machines are added. While processes 404 to 408 are shown as a sequence for simplicity of illustration, such processes may all occur concurrently, with certain data streaming jobs being assigned to nodes, active data streaming jobs being serviced by nodes, each available node polling the central work distribution service for available jobs, and each node monitoring dependency services for such node.

In some embodiments, upon a virtual machine detecting loss of connectivity to one or more of the dependency services for the virtual machine 410, the virtual machine is to begin handing over ownership of the respective data streaming jobs that are serviced by such virtual machine back to the central work distribution service 412. The virtual machine may then cease operation and terminate.

Upon receiving the notice from the virtual machine regarding the return of ownership of the data streaming jobs from the virtual machine, the central work distribution service is to change the status of such jobs from active to available 414. The process thus may continue 404, with the available jobs being reassigned to virtual machines that are polling the central work distribution service.

The examples illustrating the use of technology disclosed herein should not be taken as limiting or preferred. This example sufficiently illustrates the technology disclosed without being overly complicated. It is not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Implementations may include:

In some embodiments, an apparatus includes a processor to process data for streaming to one or more organizations; and a memory to store data for streaming to the one or more organizations, wherein the apparatus is to provide a centralized work distribution service to track status of each of a plurality of data streams to the one or more organization, and a plurality of nodes, each node being a virtual machine to service one or more data streams to the one or more organizations, each node including: a first daemon service to monitor connectivity of the node to dependency services for the node and, upon detecting a loss of connection to one or more of the dependency services, the node to discontinue ownership of the one or more data streams of the node; and a second daemon service to poll the centralized work distribution service for data streams that are not assigned.

In some embodiments, a non-transitory computer-readable storage medium having stored thereon data representing sequences of instructions that, when executed by a processor, cause the processor to perform operations comprising: tracking of a status of one or more data streaming jobs for one or more organizations by a central work distribution service, the one or more data streaming jobs being serviced by a plurality of nodes, each node being a virtual machine; polling of the central work distribution service for available data streaming jobs by a first daemon service of each of the plurality of nodes, the central work distribution service to assign available data streaming jobs to the nodes in response to the polling; monitoring of dependency services of each of the plurality of nodes by a second daemon service of each node; and upon the second daemon service of a first node detecting loss of connectivity with one or more dependency services, discontinuing ownership by the first node of each of one or more data streaming jobs of the first node, the central work distribution service changing the status of the one or more data streaming jobs of the first node to available.

In some embodiments, a method includes tracking of a status of one or more data streaming jobs for one or more organizations by a central work distribution service, the one or more data streaming jobs being serviced by a plurality of nodes, each node being a virtual machine; polling of the central work distribution service for available data streaming jobs by a first daemon service of each of the plurality of nodes, the central work distribution service to assign available data streaming jobs to the nodes in response to the polling; monitoring of dependency services of each of the plurality of nodes by a second daemon service of each node; and upon the second daemon service of a first node detecting loss of connectivity with one or more dependency services, discontinuing ownership by the first node of each of one or more data streaming jobs of the first node, the central work distribution service changing the status of the one or more data streaming jobs of the first node to available.

In some embodiments, a system includes: data storage for system data and tenant data; a processor system to process data for streaming to one or more organizations; a network interface to provide connection with one or more user systems; and a memory to store data for streaming to the one or more organizations, wherein the system is to provide: a centralized work distribution service to track status of each of a plurality of data streams to the one or more organization, a database to store a state for each of the one or more data streams, and a plurality of nodes, each node being a virtual machine to service one or more data streams to the one or more organizations, each node including: a first daemon service to monitor connectivity of the node to dependency services for the node and, upon detecting a loss of connection to one or more of the dependency services, the node to discontinue ownership of the one or more data streams of the node; and a second daemon service to poll the centralized work distribution service for data streams that are not assigned.

Figure 5:
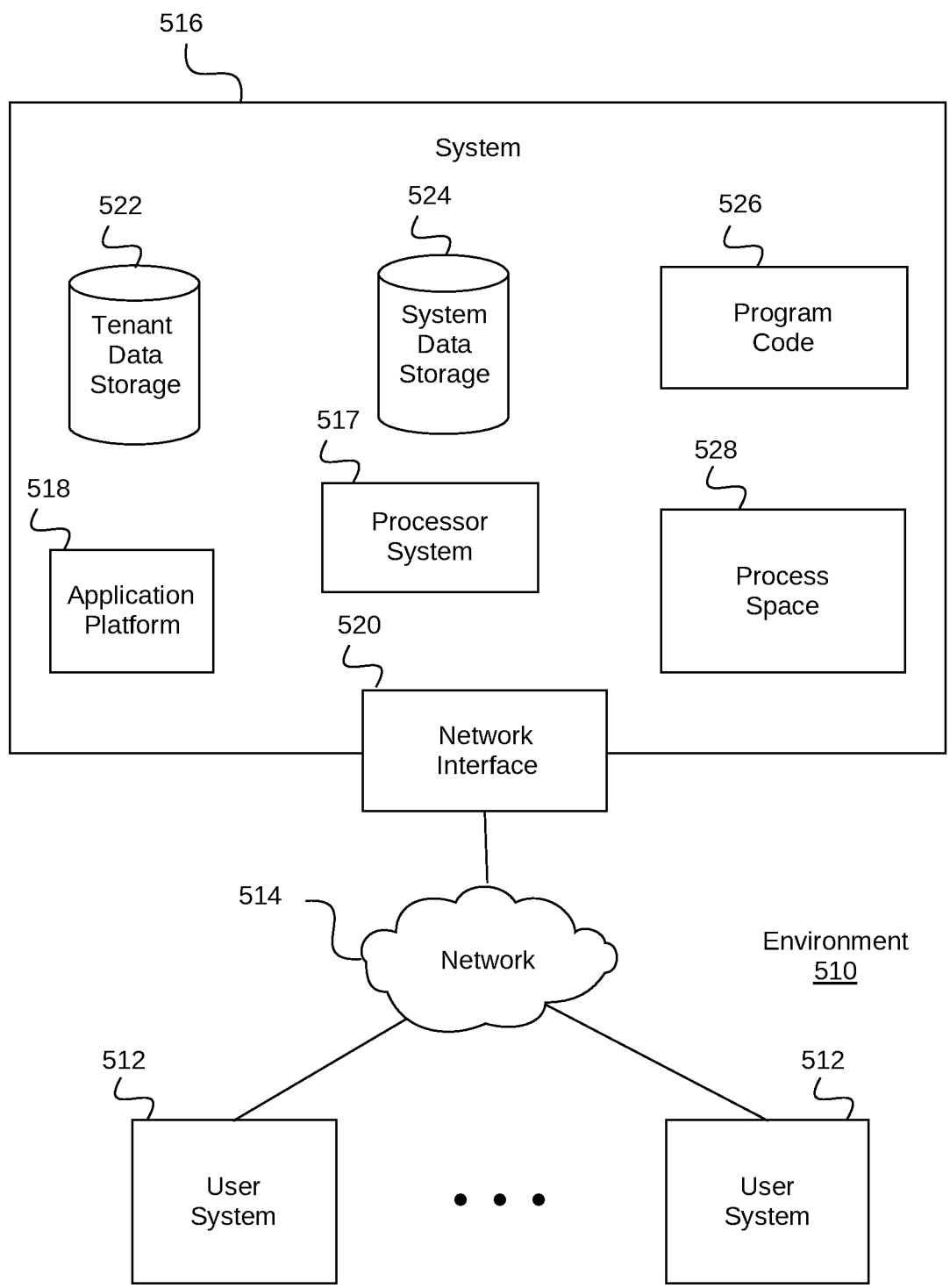
FIG. 5 illustrates a block diagram of an environment wherein an on-demand database service might be used.

FIG. 5 illustrates a block diagram of an environment 510 wherein an on-demand database service might be used. In some embodiments, the environment 510 may include transfer of data streaming services to provide continuous data flow. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
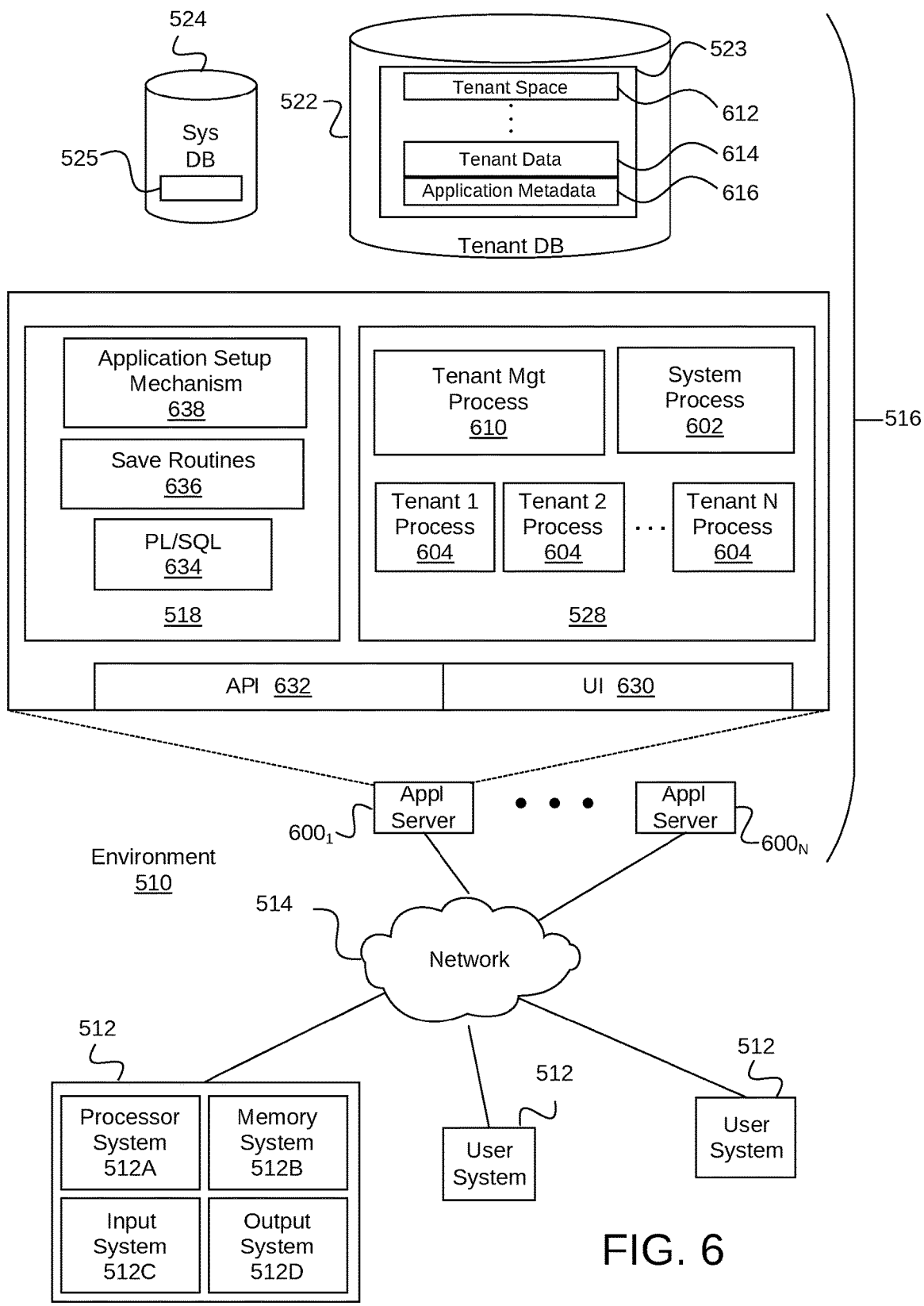
FIG. 6 illustrates details of an environment wherein an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. An apparatus comprising:
  a processor to process data for streaming to one or more organizations; and
  a memory to store data for streaming to the one or more organizations, wherein the apparatus is to provide:
    a centralized work distribution service to track status of each of a plurality of data streams to the one or more organization,
    a plurality of nodes, each node being a virtual machine having capability to service a plurality of data streams to the one or more organizations, and
    a database to store a state for each data stream serviced by any node of the plurality of nodes; and
  wherein each node of the plurality of nodes including:
    a first daemon service to monitor connectivity of the node to a plurality of dependency services for the node and, upon detecting a loss of connection to any of the plurality of dependency services for the node, the node to discontinue ownership of all data streams being serviced by the node; and
    a second daemon service to poll the centralized work distribution service for data streams that are not assigned, wherein, upon the node obtaining ownership of one or more unassigned data streams, the node is to access the database to determine a starting point for each of the one or more data streams.

2. The apparatus of claim 1, wherein the servicing of a data stream to an organization is limited to a single node of the plurality of nodes at any time.

3. The apparatus of claim 1, wherein the nodes of the plurality of nodes do not communicate with each other.

4. The apparatus of claim 1, wherein each node of the plurality of nodes operates independently from the other nodes of the plurality of nodes.

5. The apparatus of claim 1, wherein the plurality of nodes exists in a cloud computing platform.

6. The apparatus of claim 1, wherein the plurality of dependency services include one or more of a database service, a coordination service, and a cache service.

7. The apparatus of claim 1, wherein one or more data streams of each node including data representing changes occurring on a customer relationship management (CRM) system.

8. A non-transitory computer-readable storage medium having stored thereon data representing sequences of instructions that, when executed by a processor, cause the processor to perform operations comprising:
- tracking of a status of one or more data streaming jobs for one or more organizations by a central work distribution service, the one or more data streaming jobs being serviced by a plurality of nodes, each node being a virtual machine having capability to service a plurality of data streams to the one or more organizations;
- storing in a database a state for each of the one or more data streaming jobs serviced by the plurality of nodes;
- polling of the central work distribution service for available data streaming jobs by a first daemon service of each of the plurality of nodes, the central work distribution service to assign available data streaming jobs to the nodes in response to the polling;
- upon a node being assigned one or more data streaming jobs by the central work distribution service, accessing the database by the node to determine a starting point for each of the one or more data streams;
- monitoring of a plurality of dependency services of each of the plurality of nodes by a second daemon service of each node; and
- upon the second daemon service of a first node detecting loss of connectivity with any of the plurality of dependency services for the first node, discontinuing ownership by the first node of all data streaming jobs being serviced by the first node, the central work distribution service changing the status of all data streaming jobs of the first node to available.

9. The medium of claim 8, wherein the servicing of a data streaming job to an organization is limited to a single node of the plurality of nodes at any time.

10. The medium of claim 8, wherein the nodes of the plurality of nodes do not communicate with each other.

11. The medium of claim 8, further comprising instructions that, when executed by the processor, cause the processor to perform operations comprising:
- each node of the plurality of nodes operating independently from the other nodes of the plurality of nodes.

12. The medium of claim 8, wherein the plurality of nodes exists in a cloud computing platform.

13. The medium of claim 8, wherein the plurality of dependency services include one or more of database, coordination, and cache services.

14. The medium of claim 8, wherein one or more data streaming jobs of each node include one or more streams of data representing changes in a customer relationship management (CRM) system.

15. A system comprising:
- data storage for system data and tenant data;
- a processor system to process data for streaming to one or more organizations;
- a network interface to provide connection with one or more user systems; and
- a memory to store data for streaming to the one or more organizations, wherein the system is to provide:
  - a centralized work distribution service to track status of each of a plurality of data streams to the one or more organization,
  - a plurality of nodes, each node being a virtual machine having capability to service a plurality of data streams to the one or more organizations, and
  - a database to store a state for each data stream serviced by any node of the plurality of nodes;
- wherein each node of the plurality of nodes including:
  - a first daemon service to monitor connectivity of the node to a plurality of dependency services for the node and, upon detecting a loss of connection to any of the plurality of dependency services for the node, the node to discontinue ownership of all data streams being serviced by the node; and
  - a second daemon service to poll the centralized work distribution service for data streams that are not assigned, wherein, upon the node obtaining ownership of one or more unassigned data streams, the node is to access the database to determine a starting point for each of the one or more data streams.

16. The system of claim 15, wherein the servicing of a data stream to an organization is limited to a single node of the plurality of nodes at any time.

17. The system of claim 15, wherein the nodes of the plurality of nodes operate independently from each other and do not share information with each other.

18. The system of claim 15, wherein the plurality of nodes exists in a cloud computing platform.

19. The system of claim 15, wherein the plurality of dependency services include one or more of database, coordination, and cache services.

20. The apparatus of claim 1, wherein operation of the plurality of dependency services is required for operation of the node.

\* \* \* \* \*